United States Patent [19]

Blancheton

[11] Patent Number: 5,268,825
[45] Date of Patent: Dec. 7, 1993

[54] MEANS FOR FASTENING A LIGHTING OR INDICATING UNIT FOR A MOTOR VEHICLE WITH MANUFACTURING TOLERANCE COMPENSATION

[75] Inventor: Lucien Blancheton, Sens, France
[73] Assignee: Valeo Vision, Bobigny Cedex, France
[21] Appl. No.: 893,257
[22] Filed: Jun. 4, 1992
[30] Foreign Application Priority Data
Jun. 6, 1991 [FR] France .................. 91 06862
[51] Int. Cl.⁵ .................................. B60Q 1/00
[52] U.S. Cl. ........................... 362/80; 362/288
[58] Field of Search .................. 362/61, 80, 288
[56] References Cited
U.S. PATENT DOCUMENTS
3,809,880 5/1974 Davmueller et al. ............ 362/61

Primary Examiner—Stephen F. Husar
Attorney, Agent, or Firm—Morgan & Finnegan

[57] ABSTRACT

A lighting or indicating unit, such as a direction indicator, is fitted in a wing of a motor vehicle between the wing itself and a headlamp. A fastening means for fastening the unit includes a first zone of engagement between the unit and the adjacent wing, which defines a notional axis of rotation for the unit and determines, at least partly, the correct positioning of the latter with respect to the wing; a spring which applies a resilient force to the unit so as to apply a turning moment to the latter about the notional axis; and a second zone of engagement between the unit and the adjacent headlamp, this second zone being subjected to the turning moment and applying a reaction force which ensures that the unit bears on the wing in the first zone of engagement.

11 Claims, 4 Drawing Sheets

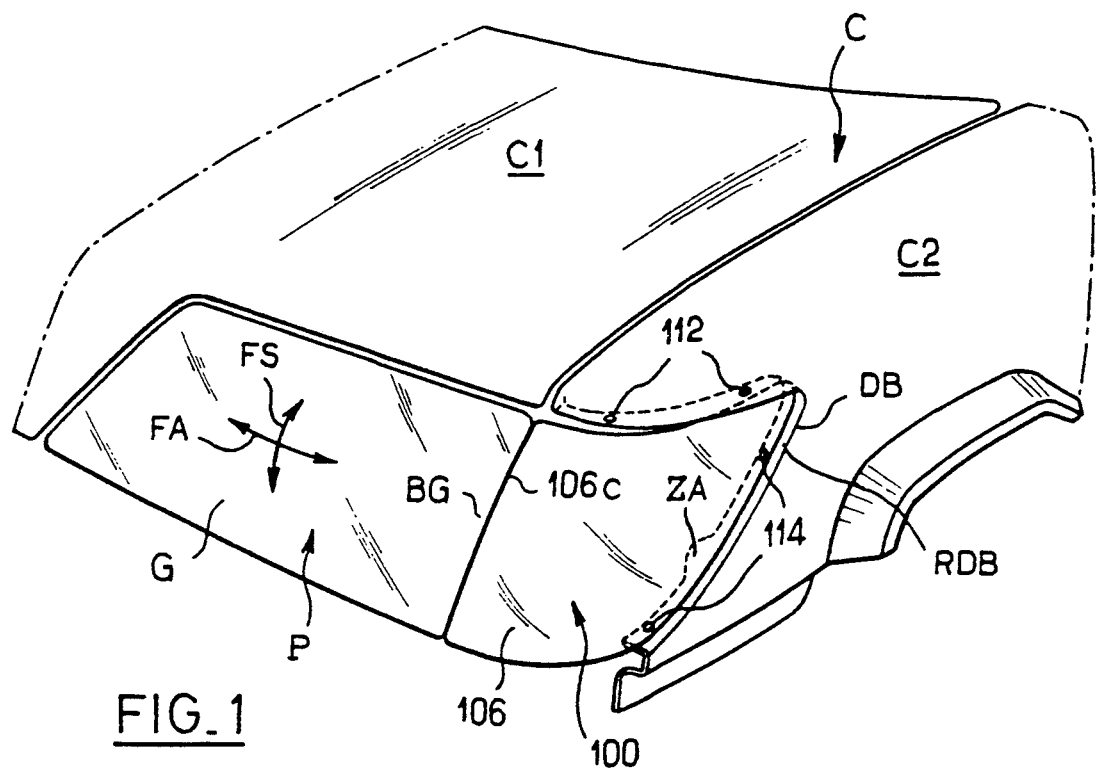
FIG_1
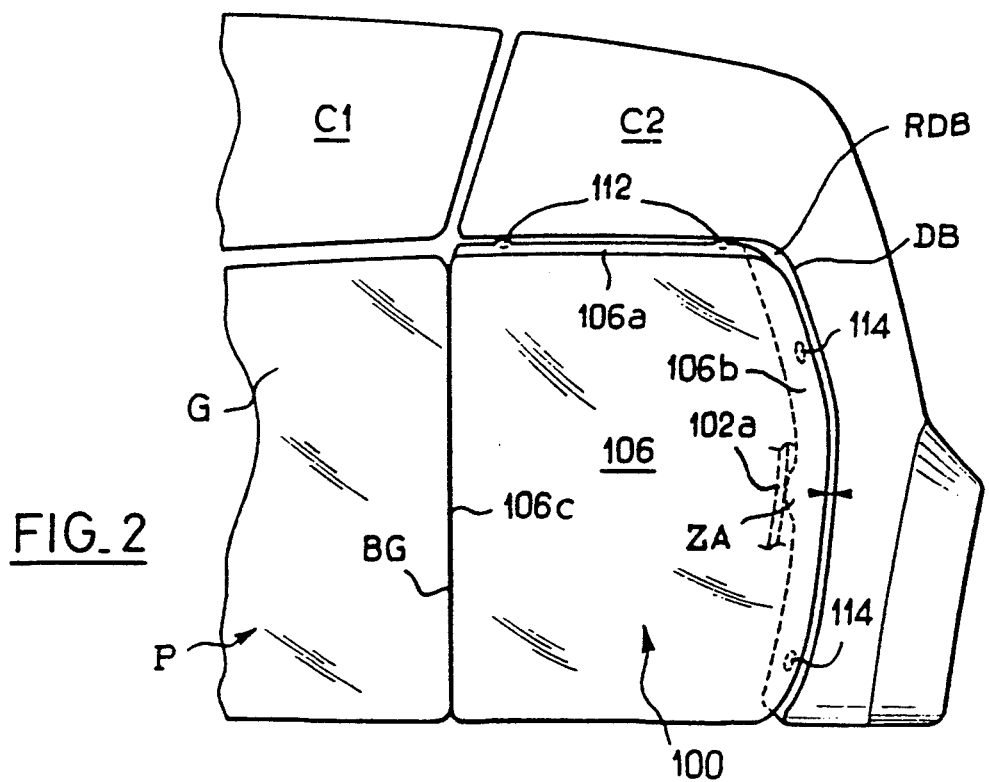
FIG_2

MEANS FOR FASTENING A LIGHTING OR INDICATING UNIT FOR A MOTOR VEHICLE WITH MANUFACTURING TOLERANCE COMPENSATION

FIELD OF THE INVENTION

This invention is concerned in general terms with the fastening of lighting and/or indicating units to motor vehicles. In particular, though not exclusively, the invention is concerned with the fitting of an indicator which is adapted to surrounding parts of the vehicle that include either fixed parts in which the geometry, dimensions or spacings tend to vary within certain limits due to manufacturing tolerances, or fixed parts together with movable parts. The invention is most particularly applicable to the fitting of an indicator, typically a flashing direction indicator, associated with a headlamp and arranged to occupy a precise position with respect to the bodywork of the vehicle.

BACKGROUND OF THE INVENTION

During fitting of an indicator for giving axial and lateral indications beside a headlamp, at least three criteria must generally be observed. These are as follows.

(1) There should be uniform spacing, and preferably contact, between the adjacent edges of the respective cover glasses of the headlamp and the indicator.

(2) There should be a uniform clearance or spacing between the upper edge and the side edge (on the side opposite to the headlamp) of the cover glass of the indicator on the one hand, and a rimmed aperture or the like formed in the wing of the vehicle on the other hand.

(3) Any departure from a flush relationship between the cover glass of the indicator and the outer surface of the wing should be controlled, that is to say that, for example at mid-height of the cover glass, the latter should be recessed inwardly by a predetermined distance with respect to the surface of the wing.

In current practice these objectives are difficult to attain. In this connection the headlamp is conventionally fixed on to a headlamp support in the form of an element which is itself assembled, for example by welding, on to an internal stiffening member of the wing. In addition, this stiffening member is welded or bolted on to the wing itself. Manufacturing tolerances of the various components concerned, and inaccuracy in assembly, are such that currently known techniques for fastening the indicators are either very simple but do not satisfy all the criteria indicated above, or else they are somewhat complex and costly, and have to include adjusting means requiring long and tedious adjustment.

DISCUSSION OF THE INVENTION

An object of the present invention is to overcome the above drawbacks of the prior art. To this end, according to the invention, a fastening means for fastening a lighting and/or indicating unit between two adjacent parts of a motor vehicle, is characterized in that the fastening means includes:

a first zone of engagement between the lighting and/or indicating unit and an adjacent first one of the said parts, defining a notional axis of rotation of the lighting and/or indicating unit and determining at least partly the correct positioning of the latter with respect to the said first part;

a resilient means capable of applying to the said lighting and/or indicating unit a resilient force giving rise to a turning moment about the said notional axis; and a second zone of engagement between the said lighting and/or indicating unit and the adjacent second one of the said parts, the said second zone being subjected to the action of the said turning moment so that the reaction force exerted by the said adjacent second part ensures engagement between the lighting and/or indicating unit and the said adjacent first part in the said first zone of engagement.

Further features, objectives and advantages of the present invention will appear more clearly on a reading of the detailed description of a preferred embodiment of the invention which follows, and which is given by way of example only and with reference to the accompanying drawings.

BRIEF DESCRIPTION OF THE DRAWINGS

FIG. 1 is a diagrammatic perspective view of a front corner of a motor vehicle including a headlamp and an indicator of the kind referred to herein as a wing indicator, which is appended to the side of the headlamp.

FIG. 2 is a front elevation of the wing indicator.

DESCRIPTION OF A PREFERRED EMBODIMENT OF THE INVENTION

Figure 3:
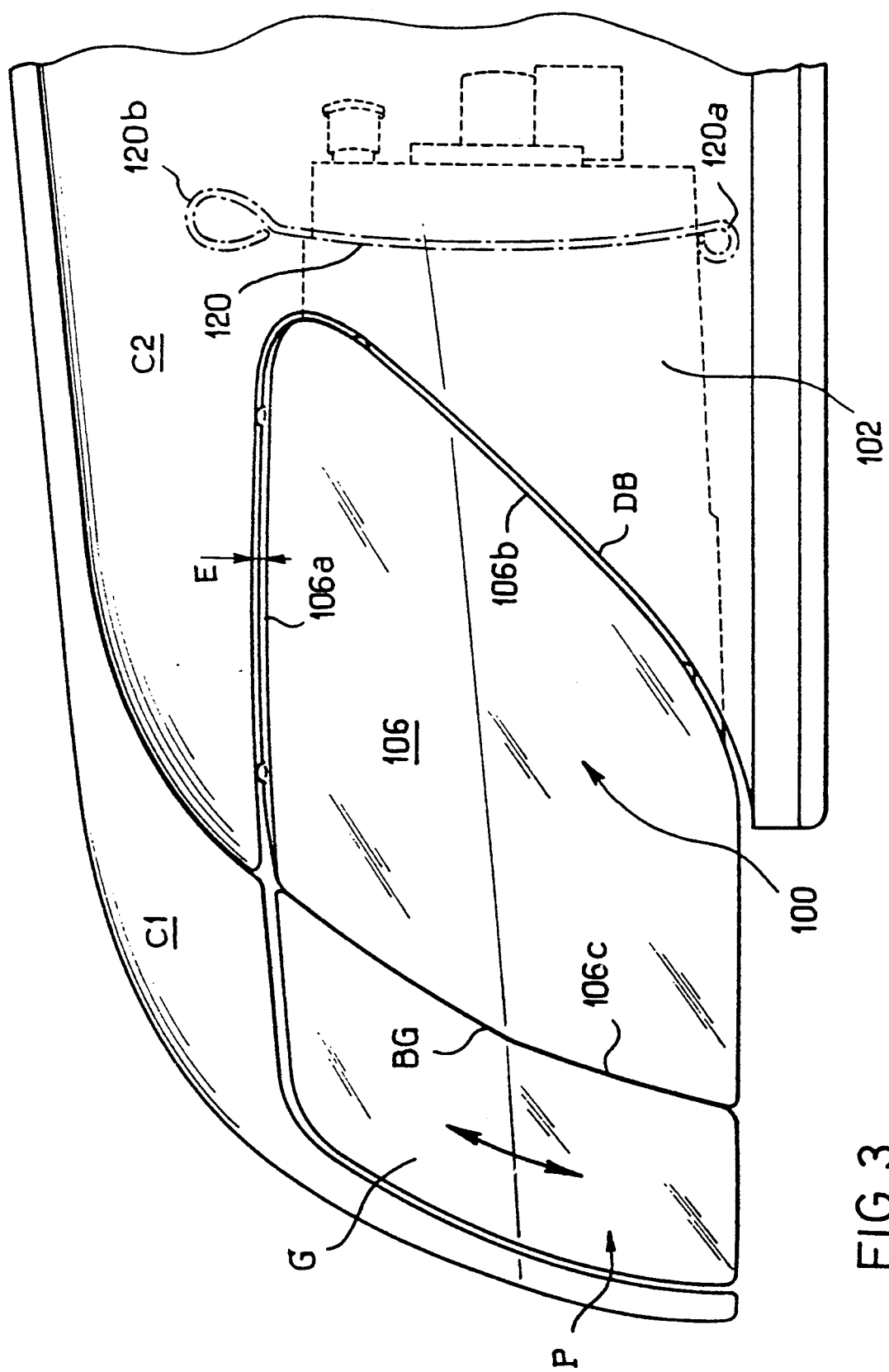
FIG. 3 is a side elevation of the wing indicator.

The drawings show part of the bodywork C of a motor vehicle having a hood C1 and a first part of the vehicle comprising a wing or fender C2. A second part of the vehicle comprising a headlamp P on the front of the vehicle has a glass G which terminates at its outer side in an edge BG, which is essentially rectilinear and which is preferably vertically oriented.

Appended to the headlamp P, adjacent to its outer edge BG, is the indicating unit 100, which is profiled so as to be effectively a continuation of the wing C2 and which is referred to in this description as a wing indicator. The indicator 100 is typically (though not necessarily) a direction indicator of the flashing type.

The wing indicator 100 comprises a housing 102, a lamp 104 mounted on a lamp holder 105, a cover glass or globe 106, and optical elements 108 and 110. One of the optical elements 108, 110 may for example be colored so that the indicator 100 emits a colored beam. The optical elements 108, 110 are arranged to distribute the light emitted by the lamp 104 in any appropriate known way. The lamp 104 and lamp holder 105 may be considered to constitute a lighting/indicating member.

The cover glass 106 is assembled rigidly to the housing 102. It is provided in the present example in a known manner with four bosses, two of which (indicated at 112) are disposed on an internal flange 106a in the upper part of the glass 106. The other two bosses, indicated at 114, are disposed on an internal flange 106b in the side region of the cover glass 106 that is distal with respect to the headlamp P. These bosses, which have a depth that is carefully predetermined and may for example be a few millimeters, are applied against an internal flange RDB of a rimmed aperture DB, which is formed in the wing C2 for receiving the wing indicator during fitting of the latter. The bosses 112, 114 define a uniform clearance E between the upper and side edges of the cover glass and the rimmed aperture DB. In order to render these bosses as inconspicuous as possible, they are formed on the flanges 106a and 106b as far as possible from the front face of the cover glass 106.

The edge 106c of the cover glass 106 lying on the same side as the headlamp is preferably rectilinear and vertical, and in the present example it is arranged to be intimately juxtaposed against the adjacent edge BG of the cover glass G of the headlamp. In a modification, however, a uniform, non-zero, clearance may be provided between the two glasses G, 106, for example using bosses of the same kind as the bosses 112, 114.

Figure 4:
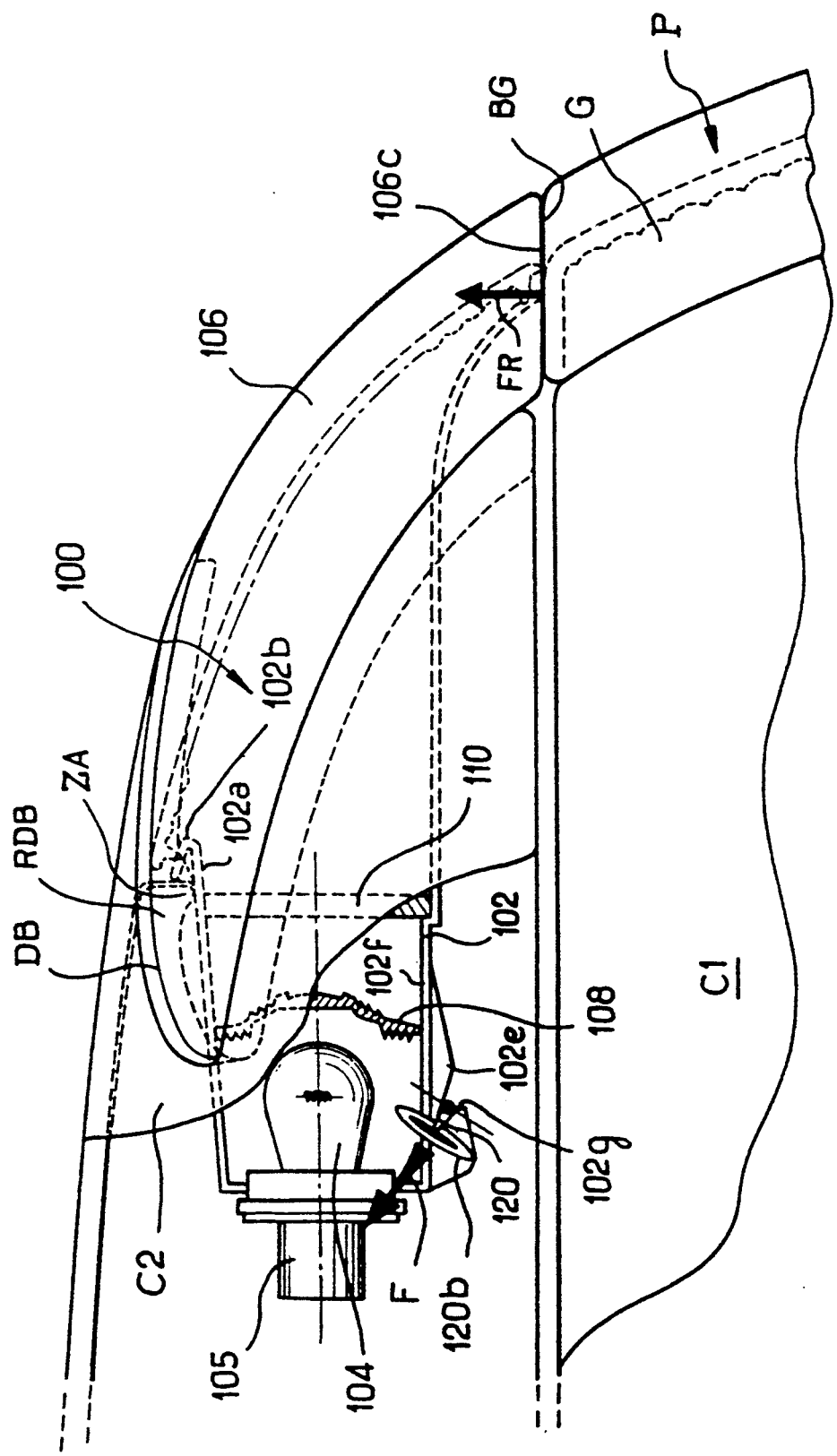
FIG. 4 is a top plan view, partially broken away, of the wing indicator.

As is best seen in FIGS. 1, 2 and 4, the internal flange RDB of the aperture DB has, in the part which corresponds to the outer lateral edge of the cover glass 106 of the wing indicator, and approximately at mid-height, a zone which is widened towards the interior and which defines a curved profile. This zone is designated by the reference ZA. It is provided in order to enable a side wall 102a of the housing 102 (shown partly in FIG. 2) to bear against its top. By suitably determining the distance between this top and the outer surface of the wing C2, the cover glass 106 can be made flush with the latter.

It will also be noted that, in the region of the housing 102 that bears against the widened portion ZA, the housing has a projecting lug 102b, the horizontal cross section of which is approximately in the form of a U. One branch of the projection 102b lies externally and has a free end which is able to engage against the anterior surface of the flange RDB, as is best seen in FIG. 4.

Figure 5:
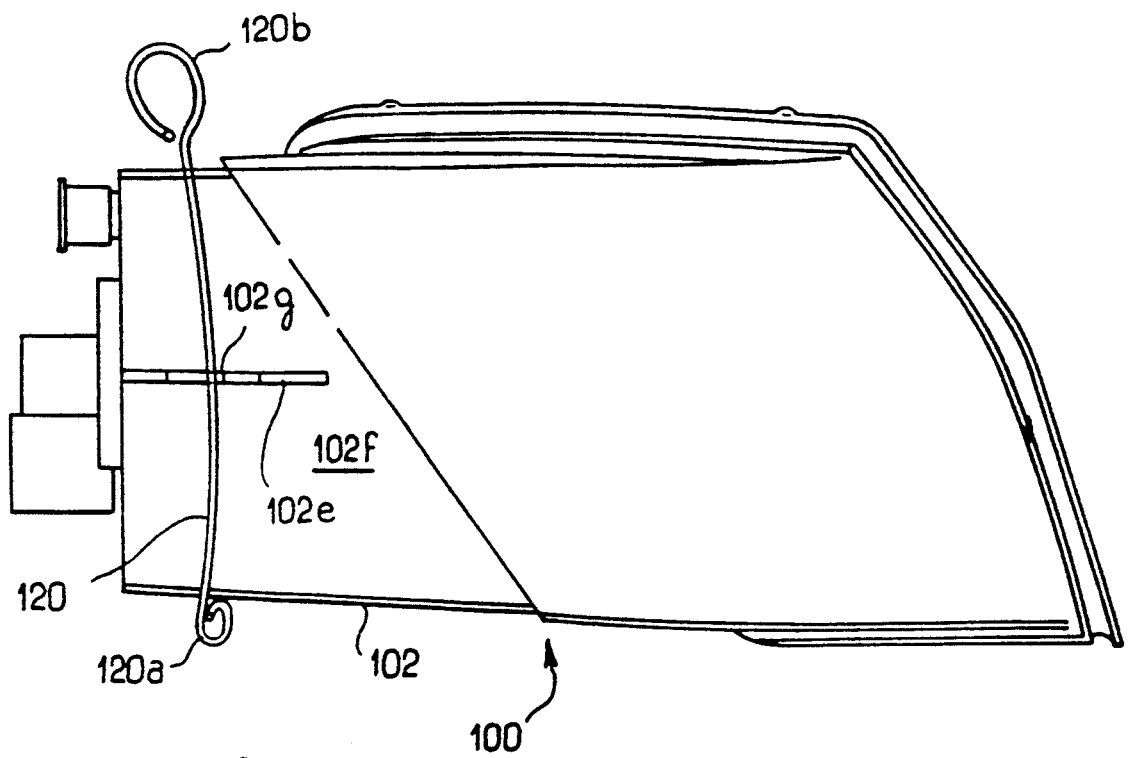
FIG. 5 is a view of the wing indicator seen in side elevation from the direction of the headlamp.
Figure 6:
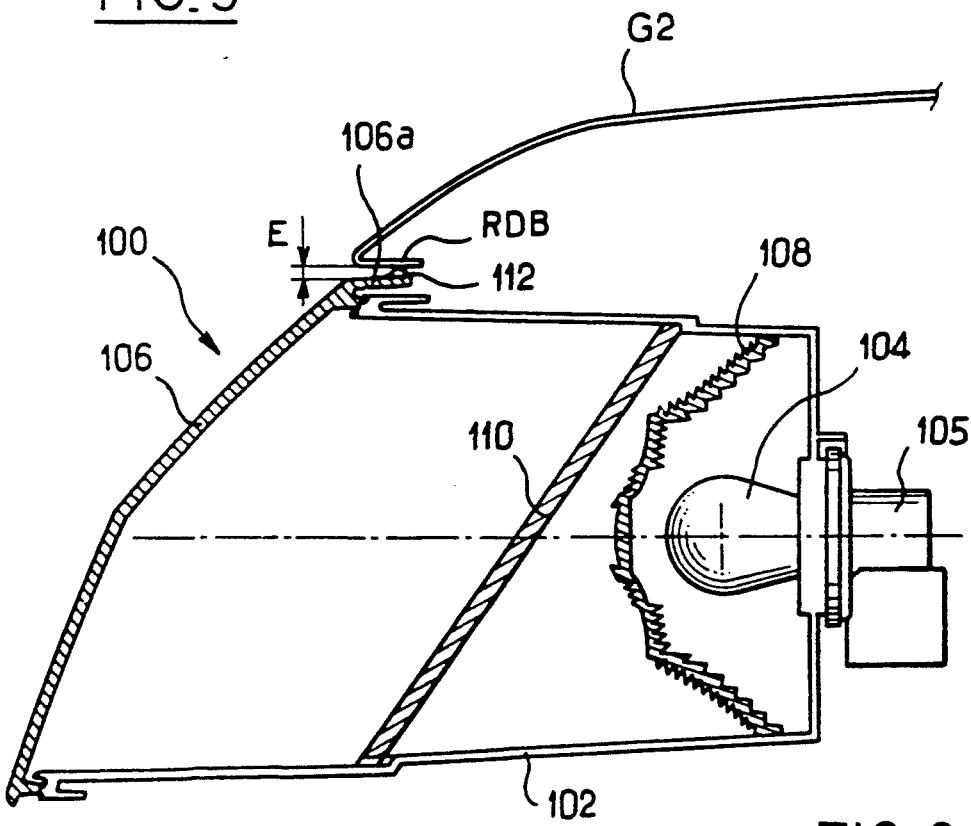
FIG. 6 is a view of the wing indicator in vertical cross section.

In order to ensure the various contacts and engagements between various elements described above, a biasing means comprising a spring 120 is provided. In this example the spring 120 consists of a flexible spring wire which is oriented essentially vertically. The spring 120 bears at its upper and lower ends on the bodywork of the vehicle, and in its middle region it bears on the housing 102 of the wing indicator. More precisely, and as is best seen in FIG. 5, the lower end of the spring 120 is formed with a loop 120a which is fixed to the bodywork by any appropriate known means, for example by penetrating into an anchor slot formed in the bodywork for this purpose. The upper end of the spring 120 in this example is formed with another loop 120b, which may for example engage in an open anchor or retaining element provided for this purpose in the bodywork.

The housing 102 has a rib 102e, FIGS. 4 and 5, extending in an essentially horizontal plane and disposed at approximately mid-height along the internal lateral wall 102f of the housing. A seating element, in the form of a notch 102g, is formed in the rib 102e, and has a cross section which is slightly larger than that of the wire spring 120, the middle region of which engages in the notch 102g. The position of the cooperating anchor points of the spring 120 and the notch 102g are such that the spring is put under tension when being fitted, so as to exert on the housing a biassing force which acts approximately in the direction of the arrow F in FIG. 4. It will be noted that this direction F is oblique, extending towards the rear and towards the side of the vehicle. In this way it can be ensured that the above mentioned contacts can be made with the appropriate degree of closeness, so that the wing indicator is positioned in such a way as to satisfy the criteria mentioned in the earlier parts of this description.

More precisely, the force F generates a turning moment about a notional axis of rotation, which may be postulated as passing through the zone of engagement of the wall 102a with the widened portion ZA. This moment is reproduced at the level of the lateral edge 106c of the cover glass 106, so as to juxtapose the edge 106c intimately against the adjacent edge BG of the headlamp cover glass. The edge 106c may therefore be considered as the second end of the housing 102 since the moment imparted to the housing by spring 120 causes the edge 106c to adjoin the edge BG. The reaction force FR exerted by the edge BG ensures that the lateral wall 102a of the housing bears firmly against the engagement zone ZA. The first end of the housing 102 is constituted by the portion of the lateral wall 102a which bears against the engagement zone ZA and the free end of the projection 102b which engages the flange RDB.

A particular advantage of the arrangement described above is that the method of fitting the wing indicator enables the headlamp to move during adjustment of its beam, in both horizontal and vertical planes. In the case of adjustment in the vertical plane (by pivoting as indicated by the arrows FS in FIG. 1), the headlamp simply slides on the indicator 100 in their plane of mutual contact. For adjustment of the headlamp in azimuth, i.e. in a horizontal plane as indicated by the arrow FA in FIG. 1, the resilient force which is exerted by the biassing spring 120, and which biasses the indicator 100 against the headlamp P, causes the indicator 100 always to follow the movements of the headlamp.

The present invention is of course in no way limited to the embodiment described above and shown in the drawings, but may be modified in any suitable way within the scope of the invention.

What is claimed is:

1. A motor vehicle including a first component, a second component, and a lighting/indicating unit, the vehicle having fastening means securing said unit between and adjacent to said first and second components, wherein said fastening means comprises: means defining a first zone of engagement for engagement of said unit with said first component; means defining a second zone of engagement for engagement of said unit with said second component; and resilient means carried by the vehicle and applying a resilient force to said unit, said first zone of engagement defining a notional axis of rotation of said unit and at least partly determining correct positioning of the latter with respect to said first component, whereby the resilient force exerted by said resilient means produces a turning moment tending to rotate said unit about said notional axis, such that said turning moment acts on the second zone of engagement so that the latter exerts a reaction force to cause said unit to bear on said first component in the first zone of engagement.

2. A vehicle according to claim 1 having a body including a bodywork element defining an aperture therein, and a headlamp close to said bodywork element, said bodywork element and headlamp being the said first and second mutually adjacent components of the vehicle, respectively, and said unit being an indicating light unit.

3. A vehicle according to claim 2, wherein the indicating unit includes a housing, said bodywork element including a flange surrounding said aperture therein and defining a widened zone of the flange, the indicating unit having a cover glass, said housing having an external lateral wall, said first zone of engagement defining a clearance between the external lateral wall of the housing and said widened portion of the bodywork element, with said clearance extending in the same direction as said reaction force, and with the cover glass of the indicator unit and said internal flange together defining a further zone of engagement between them in a direction substantially transverse to that of said reaction force.

4. A vehicle according to claim 3, wherein the cover glass of the wing indicator has a plurality of bosses for engagement with said internal flange, so as to maintain a substantially constant spacing between the cover glass and said bodywork element.

5. A vehicle according to claim 3, wherein the cover glass of the wing indicator has a lateral edge and the cover glass of the headlamp has an adjacent lateral edge, said lateral edges together defining said second zone of engagement.

6. A vehicle according to claim 5, defining a substantially vertical plane and an axis substantially at right angles to said plane, with the means defining the second zone of engagement extending in the said plane whereby to permit the headlamp to pivot about said axis.

7. A vehicle according to claim 1, having a first anchor point and a second anchor point, the lighting/indicating unit having a housing, said resilient means comprising a wire spring having an upper end and a lower end, secured at said first and second anchor points respectively, and an intermediate region, the said housing defining a seating element receiving said intermediate region of the wire spring, the seating element and the housing being so positioned that the spring is precompressed.

8. A vehicle according to claim 7, wherein the means defining the first zone of engagement and said seat element lie approximately at mid-height of the unit.

9. A lighting/indicating assembly for a vehicle comprising:
    a lighting/indicating member;
    a housing on which said lighting/indicating member is mounted, said housing including a first end pivotally connectable to a first part of a vehicle and defining a notional axis of rotation, and a second end for bearing against a second part of the vehicle; and
    a biassing member engageable with the vehicle and said housing for applying a turning moment to said housing about said notional axis of rotation so that said second end of said housing bears against the second part of the vehicle and said second part of said vehicle exerts a reaction force causing said first end of the housing to bear against the first part of the vehicle.

10. A lighting/indicating assembly according to claim 9 wherein said biassing means comprises a spring having a pair of end portions, each end portion being engageable with the vehicle, and a middle region engageable with said housing.

11. A lighting/indicating unit according to claim 9 wherein the first end of said housing is generally U-shaped in cross-section.

* * * * *